Patented July 14, 1942

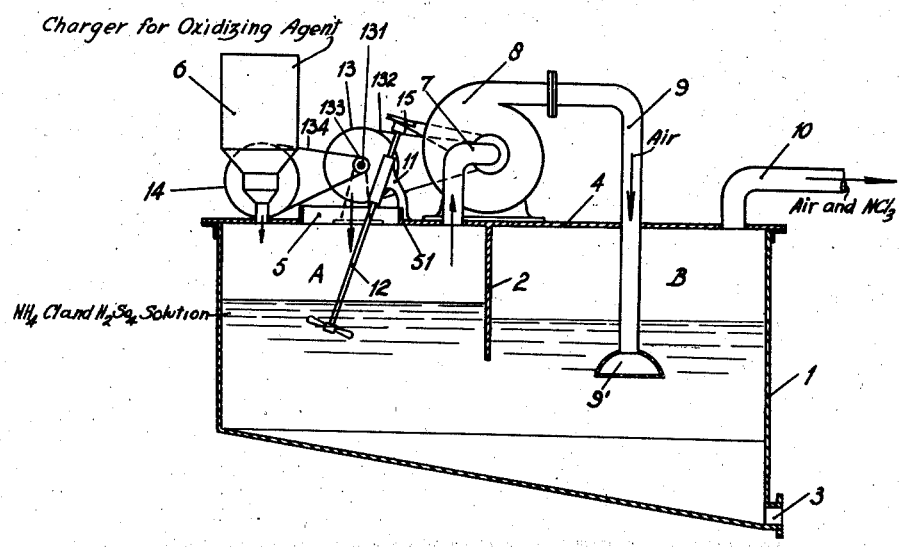

2,289,436

UNITED STATES PATENT OFFICE 2,289,436

PROCESS FOR PRODUCING GAS CURRENTS CARRYING PREDETERMINED QUANTITIES OF NITROGEN TRICHLORIDE

Adrianus Kleijn, Rotterdam, Netherlands

Application July 18, 1939, Serial No. 285,086 In the Netherlands October 11, 1938

2 Claims. (Cl. 23—205)

The present invention relates to the production of gas currents carrying halogenated nitrogen compounds as, for example, nitrogen trichloride and has for an object to provide an improved process which can be economically and effectively operated by relatively untrained persons.

Nitrogen trichloride is used commercially for bleaching and for improving the baking quality of wheat and rye flour. The manner of use is of such character that it is important that the rate of production be closely controlled.

The maintenance of a supply of the material in use offers considerable difficulty under the usual commercial conditions. Ordinarily it is produced as and where used and its production must be carried on by such employees as are available in the establishment where skilled chemists are not available.

One method of preparation consists of introducing chlorine gas into a solution of ammonium chloride. This method is subject to the dangers attendant upon the handling of the chlorine by operatives not particularly skilled in this class of work. Also, chlorine must be transported in steel cylinders with the attendant considerable transportation costs including the return transportation of the empty cylinders.

In the production of the nitrogen trichloride at a substantially constant rate to meet the requirements of use, it is necessary to introduce the chlorine into the reaction retorts at a predetermined and carefully regulated rate and this requires complicated and costly apparatus.

Electrolytic methods of producing nitrogen trichloride have been proposed but this involves the expense and inconvenience of special equipment and requires operatives capable of handling the electrolytic process under conditions requiring constant supervision in order to maintain the production within the relatively narrow limits required in use. In both cases the nitrogen chloride must not be allowed to accumulate but must be carried off by a current of air or inert gas in order to be used as a bleaching agent.

The difficulties of the present practice are the greater where continuous day and night operation is necessary.

It is known that nitrogen trichloride can be prepared by reacting a hypochlorite for a considerable time with an acid solution containing ammonium ions and chlorine ions. The hypochlorite is used as a solution and no commercial process for the production of a gas containing $NCl_3$ has been based on said reaction. It is also known to remove nitrogen trichloride formed in a solution by a current of gas. The present invention provides a process in which solid oxidizing agents comprising amongst others hypochlorites are caused to react with an acid solution containing ammonium ions and chlorine ions whilst passing a gas current through said solution. Said process can be carried out to great advantage on a commercial scale to produce a gas current containing nitrogen trichloride at a rate adjusted to the requirements of use and is one that can be operated and controlled effectively to produce desired results by the operatives ordinarily available in the plants where the product is used.

The invention has been developed in the working out of a process wherein an oxidizing agent in granular or pulverized form is added to an acid solution containing ammonium chloride, and for the purposes of disclosure of the principles of the invention such a process will be more particularly described but it will be understood that the particular description is illustrative merely and is not intended as defining the limits of the invention.

The close control of the production is accomplished in the process of the present invention by controlling the rate of addition of the oxidizing agent to the reaction mixture. Conveniently, the oxidizing agent is used in granular, preferably pulverized form and is added substantially continuously at a predetermined rate, for example in a rapid succession of small doses, while the acidity and the content of ammonium ions and of chlorine ions in the reaction mixture are maintained within the necessary limits. Chlorine ions for the reaction may be supplied with or as a component part of the oxidizing agent or may be separately supplied to the bath with ammonium ions.

In the accompanying drawing forming a part hereof there is shown conventionally an apparatus for use in operating the process.

The figure is a diagrammatic sectional view of an apparatus for use in practicing the invention.

The tank 1 is shown as divided by a partition 2 depending from the cover 4 to a point well below the level of the liquid but not extending to the bottom of the tank to provide two gas chambers A and B above the level of the liquid.

A discharge outlet 3 is provided at the bottom of the tank and a charging aperture 5 is provided in the cover. An upstanding flange 51 around the aperture inhibits undesired air currents.

A charging device 6 is provided to facilitate the gradual addition of measured charges of granular material. By this charging device successive charges of granular oxidizing agent can be added at predetermined intervals. Furthermore the operation of this charging device is such that the material may be added at a rate substantially corresponding to the rate of reaction in the reaction tank. The charging device shown in Patent No. 1,925,650 is particularly suitable.

An air conduit 7 leads from the chamber A above the reaction liquid to the suction side of a blower 8 which forces a constant current of air through the conduit 9 to a distributing head 9' well below the liquid level in the chamber B. The current of air in through the opening 5 and from the chamber A effectively prevents escape of vapour or gas collecting above the liquid in chamber A and the flow of air through the reaction mixture prevents excessive concentration of the volatile product of the reaction within the solution. A discharge conduit 10 carries the air charged with nitrogen trichloride to the point of use. During operation the air pressure in chamber B will cause a difference of level of the reaction mixture.

A bracket 11 on the cover carries a stirring device 12. The charge feeding device 6 and the stirrer 12 are connected to be driven when the blower 8 is operated. The blower may be driven by an electric motor, not shown, and pulleys 14 and 15 of the charging device and the stirrer may be connected to be driven from the blower as by belt gearing conventionally indicated at 13, 131, 132, 133, 134. By this arrangement the feed of material in the device 6 always stops when the air current is discontinued.

In operation the tank is charged with a reaction mixture consisting of an acidified aqueous solution of ammonium chloride.

If bleaching powder is used as oxidising agent the solution may contain e. g. about 2% ammonium chloride and about 5% sulphuric acid. Instead of ordinary bleaching powder preferably a product with a higher content of calcium hypochlorite is used. Such products are in the trade and may contain e. g. 70% and more of active chlorine.

In order to provide the desired reaction the charging device 6 is filled with the oxidising agent and the charging device is operated in such manner that the oxidising agent is charged into the bath at regular intervals in predetermined quantity such as will provide the formation of nitrogen trichloride at the rate desired. The reaction proceeds according to the reaction formula:

$$2NH_4Cl + 3Ca(OCl)_2 + 2H_2SO_4 = 2NCl_3 + 2CaSO_4 + CaCl_2 + 6H_2O$$

Instead of calcium- and other hypochlorites also other solid oxidising agents may be used which are capable of producing chlorine in a solution of hydrochloric acid, such as $MnO_2$, $PbO_2$ etc.

Oxidising agents in granular form are preferred because of the convenience of handling and the satisfactory results that can be obtained when this process is operated by the relatively unskilled operatives available.

The ammonium ions and the acid consumed by the reaction must be restored to the bath from time to time or continually. If no sufficient chlorine ions are brought into the bath by the oxidising agent, it is also necessary to maintain the required content of chlorine ions by suitable additions. The acidity required in the bath depends on the nature of the oxidising agent but it is preferably somewhat higher than required by the reaction formula, as for the production of $NCl_3$ the pH of the bath should not be above 4.4.

At intervals the sludge of $CaSO_4$ which accumulates at the bottom of the container may be removed through the outlet 3.

The reaction may be carried on at room temperature. Preferably the temperature is within the range 10 to 30° C. Nitrogen trichloride is formed very readily and at a rate definitely determined by the rate at which the oxidising agent is added to the reaction mixture. This is an important feature of the process and one which makes it well adapted to bleaching operations.

The nitrogen trichloride formed according to the above described process is rapidly and continually removed from the reaction liquid by a gas current e. g. an air current so that the concentration of nitrogen trichloride in the reaction liquid cannot reach a dangerous limit. At the same time a decomposition of the nitrogen trichloride in the reaction liquid is prevented so that the discharge of the nitrogen trichloride from the liquid and the addition thereof to the flour remains in proportion to the charging of the oxidising agent.

If the gas current is as uniform as the dosed delivery of the oxidising agent to the reaction liquid it will always contain a uniform content of $NCl_3$.

It is advantageous to combine the charging device as shown in the drawing in such a way to the device which causes the air current, for example to the blower, that when this device stops the charging device also stops in order to avoid the danger of a too high concentration of nitrogen trichloride in the reaction liquid. This may be obtained by driving the charging device from the shaft of the blower or by the same driving gear as the blower. This arrangement provides also a relation of the amount of charged agent to the volume of gas that passes through the blower and at a definite speed of the blower provides also a substantially constant percentage of nitrogen trichloride in the gas.

The particular description illustrates a preferred manner of practicing the invention, but it will be understood that variations may readily be introduced by the chemist without departing from the scope of the invention. For example instead of sulphuric acid it is possible to use hydrochloric acid, especially if instead of calciumhypochlorite an oxidising agent is used that does not contain chlorine such as $MnO_2$. Furthermore, it will be understood that the process is applicable to the production of other compounds than that particularly described, such, for example, as other halogenated nitrogen compounds.

The acidity and the content of ammonium chloride can be readily maintained within the effective operating limits by adding suitable ingredients through the charging aperture 5 from time to time. The acidity may be maintained either by adding an acid or a suitable salt such as acid sodium sulfate ($NaHSO_4$).

Obviously the necessary addition ingredients may be combined in a single charge insofar as the ingredients combined are sufficiently stable when so handled.

It is a feature of the process that both the oxidising agent and the ammonium chloride are harmless and easily handled and the process does not constitute a hazard when operated by the type of operatives available in the plants where the nitrogen trichloride is used.

Reference should be had to copending application, Serial No. 285,085 filed concurrently herewith.

What I claim is:

1. The process for producing nitrogen trichloride at a predetermined rate which comprises maintaining in a reaction bath a content of ammonium chloride of about 2%, a content of sulphuric acid of about 5% and adding thereto substantially continually at a predetermined rate a granular oxidising agent chiefly consisting of calciumhyprochlorite and passing a current of gas through the bath to remove nitrogen trichloride.

2. The process for charging a gas current with a predetermined quantity of nitrogen trichloride substantially free from chlorine which comprises adding substantially continuously at a predetermined rate a granular oxidising agent consisting chiefly of a hypochlorite to ammonium chloride in acid aqueous solution having a pH value below 4.4 and periodically adding ammonium chloride and acid to replace the ammonium chloride consumed and to maintain the pH value as low as 4.4 and at the same time passing the gas current to be charged in contact with said solution.

ADRIANUS KLEIJN.